INVENTOR
JOSEF MUSKAT

INVENTOR
JOSEF MUSKAT
BY Sarsoy and Taylor
ATTORNEYS 3,560,379
METHOD AND APPARATUS FOR TREATING WATER
Josef Muskat, Michelbach, Germany, assignor to Passavant Werke, Michelbacherhutte, Germany, a corporation of Germany
Filed Feb. 20, 1969, Ser. No. 801,034
Claims priority, application Germany, Mar. 14, 1968,
P 17 08 604.3
Int. Cl. C02c 1/18
U.S. Cl. 210—49
15 Claims

ABSTRACT OF THE DISCLOSURE

A method and apparatus in which a liquid to be treated is placed in an elongated aeration tank and an aeration device, adjustably mounted on a bridge extending across the top of the tank, is moved in the elongated direction of the tank. Only the liquid in the area below the device is aerated and mixed, the other areas of the tank being relatively quiescent for the promotion of flocculation. A sludge scraper attached to the bridge moves therewith to scrape sludge from a secondary tank adjacent the aeration tank.

BACKGROUND OF THE INVENTION

This invention relates generally to the subject of treating liquid, and in particular it relates to a method and apparatus for the purification of liquid such as sewage water.

It is known to provide a sewage plant having an elongated aeration tank adjacent a secondary tank, together with a bridge movable over the aeration tank and including an aerating device. However, the previous arrangements were such that as the aerating device was operated to introduce gas into the liquid, it created a flow pattern in the tank in the elongated direction thereof. For example, in an annular tank, it would cause the liquid to flow continuously in a circular path around the tank. This continuous flow of the liquid has the advantage that it prevents the individual particles of the activated sludge in the tank from settling on the floor thereof. However, it has the disadvantage that it severely inhibits the capacity of the individual particles of the liquid from flocculating into larger masses for facilitating removal from the tank.

Thus, there exists a need for an improved procedure for treating liquids such as sewage water in an aeration tank.

SUMMARY OF THE INVENTION

Thus, it is a purpose of this invention to provide a new and improved method and apparatus for treating sewage which overcomes disadvantages of methods and apparatus known heretofore.

The purpose of this invention is achieved by providing an arrangement wherein only a part of the liquid in the tank is aerated at any given moment, and wherein continuous flow patterns are prevented from being produced in the parts of the tank other than those parts being aerated. Consequently, the said other areas of the tank are relatively quiescent, thereby encouraging flocculation. Ideally, the amount of flow in the said other areas is not completely negligible since a balance must be struck between providing enough flow to prevent settlement of the individual sludge particles to the floor of the tank, while keeping the flow low enough to encourage flocculation. Unlike the prior art which provided only continuous flow in the tank, the present invention, by limiting the flow of liquid in the tank, makes it possible to achieve this balance. The larger flocs will then settle much more rapidly in a secondary tank to which the liquid is directed after the aeration tank.

In accordance with a preferred arrangement of the present invention, there is provided a sewage plant, having an elongated aeration tank, preferably adjacent a secondary tank. A bridge is located above and movable in the elongated direction of the aeration tank. Mounted on this bridge are one or more rotating aerating devices of the type which rotate about a generally vertical axis and which include a plurality of vanes mounted thereon, the aerating device being constructed and arranged such that when rotated and immersed partially into the liquid, it will cause vertical flow paths between the aerating device and the floor of the aeration tank. This is in contrast to previous arrangements which cause generally horizontal and continuous flow patterns in the elongated direction of the tank.

In a preferred embodiment of the invention, the aeration tank is located adjacent a secondary tank and the bridge is movable over both tanks. A scraping device is then attached to the ridge for movement therewith for scraping the secondary tank as the bridge moves in the elongated direction of the aeration tank.

The present invention provides a number of adtantages, one of which is economy of operation. With this invention it is no longer necessary to circulate the entire contents of the tank at the same time in order to effect the aeration. Operating efficiency is also enhanced by the fact that the circulation of the water acted upon by the rotating aerating devices, is more efficient. The aerating devices produce generally vertical flow paths which extend from the aerating device down to the lowest areas of the tank. This avoids the formation of a number of horizontal layers in the tank which would be formed in aeration tanks not having the features of the present invention as the lighter particles of solid material within the tank move upwardly and as the heavier particles of the solid material in the tank move to a lower level. In order to fully utilize the vertical flow paths, it is advantageous to design the width of the elongated aeration tank to approximately correspond with the width of the area below the aerating device in which the vertical flow paths are formed. Each aerating device may comprise either a single rotating device or a plurality of rotating devices aligned across the width of the tank.

As explained earlier, it is necessary to achieve a flow balance in the areas of the tank which at the moment, are remote from the aerating device, in order to encourage flocculation while concurrently preventing settlement of individual particles.

This balancing may be achieved by choosing a suitable travelling speed of the bridge, and hence of the rotating aerating devices, along the length of the tank. Of course it is also possible to operate a number of spaced apart bridges simultaneously so that they pass over a given part of the aeration tank in succession. For this purpose, however, it has been found particularly advantageous to arrange the rotary axis of the rotating devices such that they can deviate from the vertical direction and either be held at an inclined position or arranged to swing back and forth between opposite inclined positions. In addition the rotary axis of the rotating aerating device can be designed to oscillate or to undergo circular movement.

With these various procedures for varying the operation of the aerating devices, it is possible to control and vary gas introduction and liquid flow production either in dependence upon each other or independently from each other. Also, the aerating devices can be driven in dependence upon movement of the bridge thereby reducing the overall operating costs of the plant.

Since the level of the liquid in the aeration tank varies, the present invention also includes a means for varying the vertical position of the aerating device so that it can retain a constant position relative to the surface of the liquid. Another advantage of this adjustment feature is that the aeration device drive means and support means are always kept a predetermined distance above the water. Any suitable means may be provided for varying the vertical position of the aerating. However, in a preferred embodiment of the invention, the device is supported on a platform which is in turn supported on a floating member. The platform and the floating include guide means operatively associated with the bridge for permitting vertical movement of the platform and float while preventing lateral, or horizontal movement of the platform and float relative to the bridge. According to another feature of the invention, the undersurface of the bridge may be designed with a downwardly concave shape to act as a baffle for receiving water thrown outwardly by the aerating device and directing the same downwardly to the bottom of the tank. The baffle thereby enhances the development of the vertical flow paths.

According to another feature of the invention the aerating device comprises a support member having formed thereon a plurality of vanes which extend outwardly and downwardly therefrom and relative to the rotating axis thereof. This type of aerating device is particularly applicable when raw waste water is to be introduced directly into the aeration tank. The aerating device will not clog or jam when contacted with coarse and fibrous material since its vanes will throw the solid material outwardly and downwardly. In addition, this type of aerating device has been found particularly suitable for controlling the formation of the flow paths and quiescent zones in the tank in the manner described above.

The invention also encompasses a new and improved method for treating water in an aeration tank, wherein only a part of the tank is treated at any one time in order to provide aeration and circulation of the liquid in that part. Each part would be acted upon in spaced apart intervals of time. This provides a considerable saving in input energy since only a portion of the contents, of the basin, rather than the entire contents of the basin is acted on at any given time. In addition, with this method the portion of the tank not being acted upon is left free to become quiescent for the purpose of encouraging flocculation. During these quiescent periods, the individual solid particles of the fluid can agglomerate to form larger flocs without being constantly separated by flow paths through the liquid. Since this increased flocculation reduces the settling period in the secondary tank, it provides a further economy in operation by permitting a reduction in the overall size and the operating requirements within the secondary.

Thus, it is a purpose of this invention to provide a new and improved method and apparatus for treating a liquid such as sewage water in an aeration tank.

It is another object of this invention to provide a new and improved method and apparatus for treating liquid in an aeration tank, wherein the aeration procedure causes flow within only a small part of the aeration tank at any one time.

It is another object of this invention to provide a method and apparatus for the treatment of sewage water wherein the flow paths created by aeration are limited so that a balance of flow may be achieved in other parts of the tank, for preventing settling of individual particles while encouraging flocculation.

It is another object of this invention to provide a new and improved sewage apparatus wherein a sludge scraper for a secondary tank may be connected to a bridge for movement as the latter moves along an aeration tank.

It is another object of this invention to provide an improved method and apparatus in the treatment of sewage water including a rotating aerating device in which the orientation of the rotating axis may be varied and or the vertical position of the aerating device can also be varied.

Other objects and the attendant advantages of the present invention will become apparent from the detailed description to follow together with the accompanying drawings.

BRIEF SUMMARY OF THE DRAWINGS

There follows a detailed description of a preferred embodiment of the invention to be read together with the accompanying drawings. However, it is to be understood that the invention is capable of numerous modifications apparent to those skilled in the art without departing from the spirit and scope of the invention.

Figure 1:
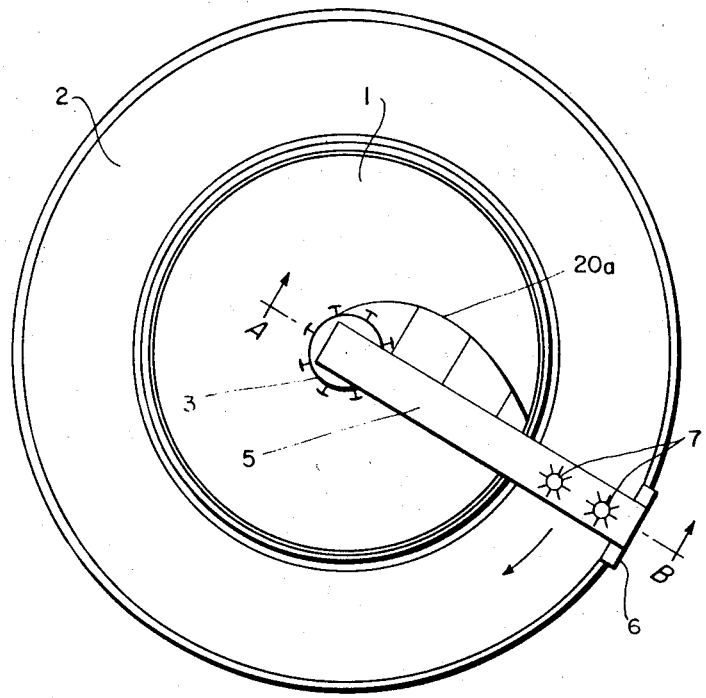
FIG. 1 is a plan view of a sewage plant constructed in accordance with the features of the present invention.

FIIG. 2 is a partial sectional view taken along line A–B of FIG. 1.

Figure 2:
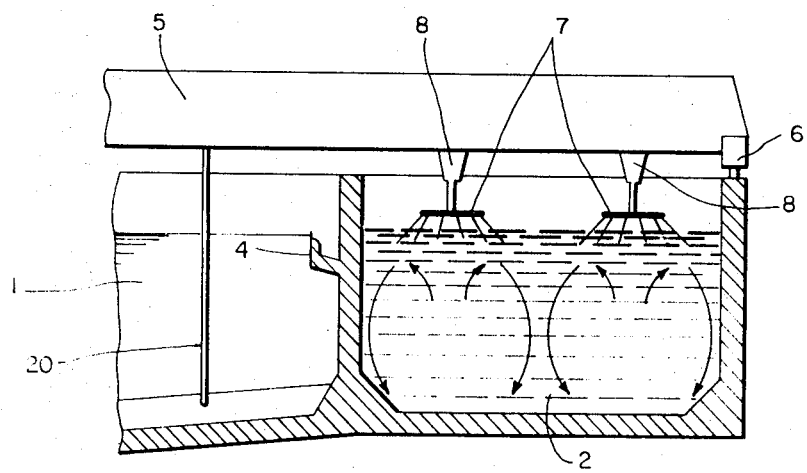
Figure 3:
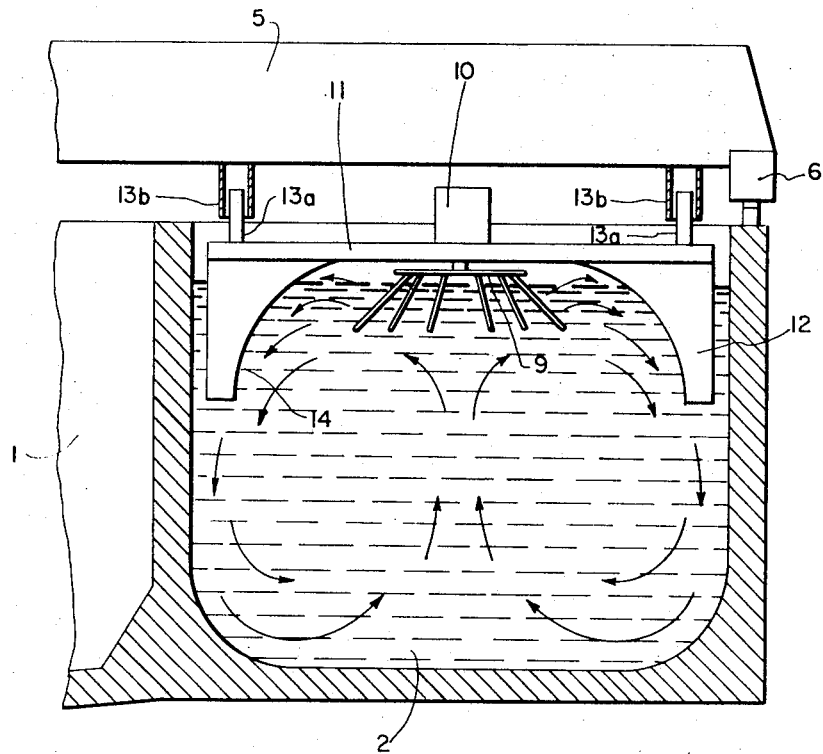

FIG. 3 is a sectional view similar to FIG. 2 but showing a modified form of the invention.

Figure 4:
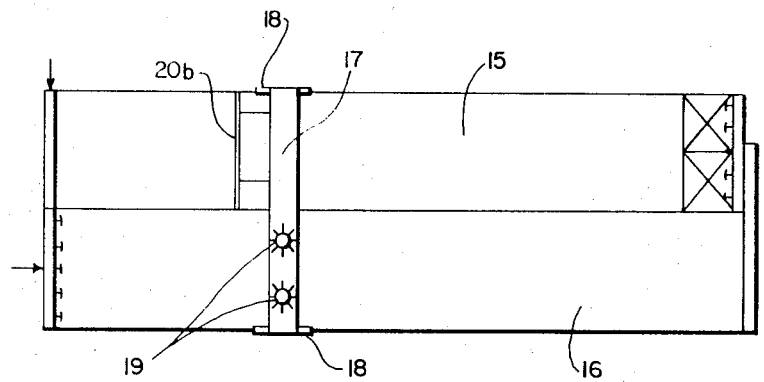

FIG. 4 is a plan view showing a modified sewage plant incorporating the features of the present invention.

Figure 5:
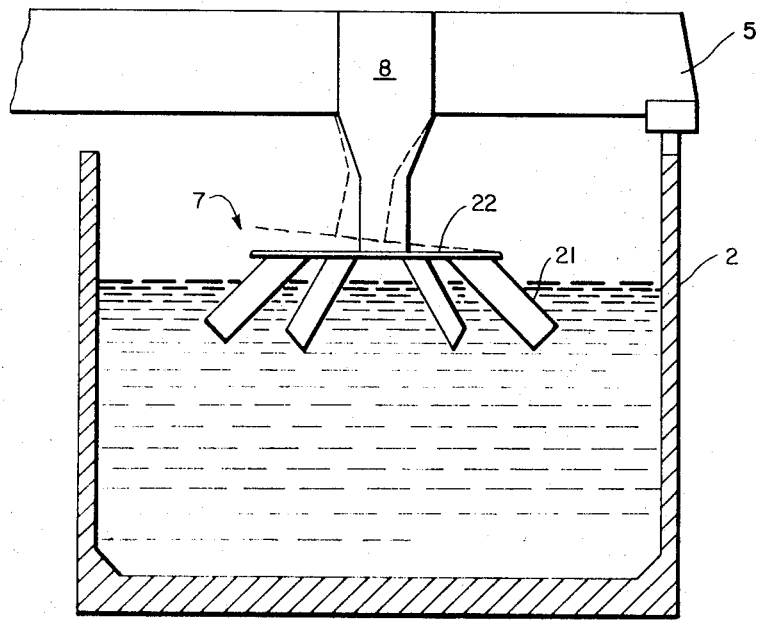

FIG. 5 is an elevational view showing an aerating device which may be employed in the present invention.

Figure 6:
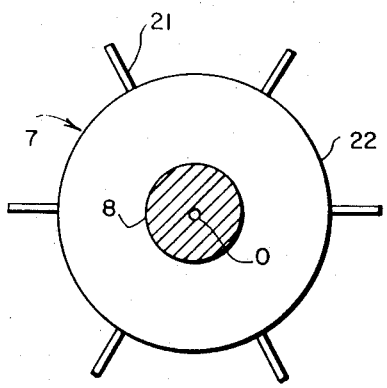

FIG. 6 is a horizontal sectional view of a portion of FIG. 5.

DETAILED DESCRIPTION OF THE PREFERRED EMBODIMENTS

Referring to the drawings, like numerals are used to represent like elements throughout the several views.

Referring now to FIGS. 1 and 2, there is shown a circular secondary tank 1 surrounded by an annular aeration tank 2. The sewage water, after being aerated in the aeration tank 2, leaves aeration tank and passes to a central influent inlet 3 where it enters the secondary tank 1. Effluent is removed from the secondary tank 1 by means of the discharge channel 4. A bridge 5 extends from the center of the secondary tank across the both of the tanks to the outer periphery of the aeration tank 2 whereat the bridge engages the outer periphery of the tank 2 at a rolling element 6. The bridge is thereby mounted for circular movement about an axis at the center of the tank 1 so that the outer end of the bridge 5 moves about the periphery of the aeration tank 2. Mounted on the travelling bridge 5 are a pair of surface aerators arranged for contacting the liquid in the aeration tank 2 as the bridge is moved about its axis. The surface aerators comprise rotating aerating devices 7 mounted on suitable bearing means, which are shown symbolically at 8 in FIG. 2, for rotating movement about a generally vertical axis. The bridge could be constructed to be twice as long as that shown in FIG. 1, and the opposite end of the bridge could also be provided with a set of rotating aerating devices. In accordance with a feature of the present invention, these rotating aerating devices generate essentially vertically directed flow paths as indicated by the arrows in FIG. 2. On the one hand, these vertical flow paths in the area between the rotating aerating devices and the floor of the aeration tanks, prevent particles of sludge from depositing on the floor of the tank, since the flow paths extend from the aerating devices all the way down to the floor of the tank. Therefore, this arrangement insures a positive mixing of the contents of the tank below the aerating devices themselves. However, the remaining areas of the tank spaced from the aerating devices both in front of and to the rear of the travelling bridge are effected only slightly so that these zones in front of and to the rear of the travelling bridge are relatively quiescent, as a result of which agglomerations of the activated sludge particles into larger flocs is encouraged. Consequently, the overall operation of the sewage plant is more economical. For example, the secondary tank 1 can be reduced in size since the formation and the settling of the larger flocs is enhanced.

It is a feature of the invention that the turbulence in the quiescent zones is also controlled so that on the one hand the sludge particles cannot settle, and on the other hand, flocculation is encouraged. A number of procedures are possible for so controlling the turbulence in the quiescent zone. For example, the speed of travel of the bridge, or of the bridges, can be controlled and varied. Further, the rotating aerating devices themselves can be so designed that their rotary axes may be inclined relative to the vertical, either permanently or for the purpose of swinging back and forth. The size and the number of rotating aerating devices can be so selected and arranged that the width of the aeration tank 2 corresponds approximately to the width of the area containing the vertical flow paths. This of course increases the overall efficiency of the apparatus.

Efficient operation of the rotating aeration devices is substantially dependent upon the depth to which the vanes are immersed into the water. It is therefore most desirable to retain a constant immersion depth notwithstanding variations in the level of the water in the tank. For this purpose, it is necessary that the rotating aerating devices be designed such that their vertical positions can be varied. A number of different arrangements are possible for effecting this variation. However, in accordance with a preferred feature of the embodiment, one such apparatus is shown in FIG. 3.

Referring to FIG. 3, there is shown, in accordance with one modification of the invention, a single rotating aerating device 9 in lieu of the pair of rotating devices shown in FIGS. 1 and 2. In addition, FIG. 3 shows the means for varying the vertical position of the aerating device. The bearing means and the aerating means of the rotating aerating device 9 are shown symbolically at 10 and are mounted on a platform 11 which in turn rests upon a floating member 12. The platform and the floating member include guide elements 13a which are engageable in vertical slots 13b on the bridge 5. Consequently, the platform 11 and the floating member 12 are movable vertically relative to the bridge 5 but are prevented from undergoing lateral or horizontal movement relative to the bridge 5. Consequently, the platform 11 and the floating member 12 and also the rotor 9 and its associated elements 10 are carried along the aeration tank 2 upon travelling movement of the bridge 5.

The lower surface 14 of the float 12 is designed to act as a baffle for increasing the efficiency of the apparatus. This baffle serves a number of purposes. First, it enhances the formation of the vertical flow paths, and secondly, it receives water thrown above the surface by the action of the rotating aeration device and deflects the same downwardly in the liquid thereby enhancing circulation.

FIG. 4 illustrates an alternative arrangement of a sewage plant utilizing the features of the present invention. As shown therein, both the secondary tank 15 and the aeration tank 16 are straight rather than curved and are adjacent and parallel to each other. A bridge 17 extends cross both of the tanks in the transverse direction and includes a pair of rolling elements 18 spaced apart at opposite ends of the bridge 17 for engagement with remote sides of the tanks 15 and 16. Consequently, the bridge 17 is arranged for linear movement in the longitudinal direction of the tanks 15 and 16. The bridge has formed thereon a number of rotating aerating devices 19 for engagement with the liquid in the aeration tank, these devices 19 being constructed in exactly the same manner as described above with reference to FIGS. 1 through 3.

In accordance with another feature of the invention, a scraping device for scraping the secondary tank can be connected directly to the bridge for movement within the secondary tank during the travelling movement of the bridge. For example, the circular sewage plant arrangement of FIGS. 1 through 3 may include a scraping gear 20a mounted on the travelling bridge 5 for movement therewith in a circular path upon travelling movement of the bridge 5. Similarly, in the embodiment of FIG. 4, a scraper 20b may be connected to the portion of bridge 17 over the secondary tank 15 for movement in a linear direction upon travelling movement of the bridge 17.

The invention is not limited to any specific type of construction of the rotating aerating device. It is only necessary that this rotating device be constructed to form the vertical flow paths referred earlier in the application. However, in a particular advantageous arrangement, the vanes of the device are arranged to extend outwardly and downwardly relative to the axis of rotation. With this arrangement, clogging or jamming of the device is practically eliminated since all solid and fibrous material is thrown outwardly by the vanes.

Although the particular configuration of the vanes and the number of vanes can be varied within a wide range, there follows by way of illustration and not by way of limitation the description of a rotating aerating device which is suitable for use in the present invention. As shown in FIGS. 5 and 6, this arrangement includes a plurality of vanes 21, for example, six vanes as shown in the drawing, which extend downwardly and outwardly from a disc shaped supporting element 22. The blades are long and relatively narrow. For example, the ratio of the width to the length may be between 1–2 and 1–5. As the blades rotate about the axis O, the liquid in the area between the vanes is thrown generally outwardly thereby drawing liquid upwardly from the area immediately below the center of the device, and then across between the vanes and outwardly. After the liquid has flowed outwardly beyond the vanes, the liquid is drawn downwardly along the wall of the aeration tank 2 and back to the area beneath the center of the rotating aeration device 7. In this embodiment the longitudinal axis of the individual vanes are inclined approximately 45° to the vertical axis of rotation, and the vanes are formed as generally flat members lying in vertical radial planes passing through the axis of rotation.

However, the angle of inclination may be varied; and the individual vanes 21 may be formed of different shapes and of different orientations relative to their longitudinal axes such that they form an angle with, rather than lie in the said radial vertical planes.

Although the invention has been described in considerable detail with respect to a preferred embodiment thereof, it should be apparent that the invention is capable of numerous modifications and variations apparent to those skilled in the art without departing from the spirit and scope of the invention.

I claim:

1. Apparatus for treating a liquid, comprising, a relatively narrow elongated aeration tank of a certain width for receiving liquid to be treated, a bridge member located above and movable along the aeration tank in the elongated direction thereof, and at least one aerating device mounted on the bridge for movement therewith longitudinally of the tank, said aerating device including a set of aerating means rotatable about an axis, and at least partially immersible in the said liquid, to act on the liquid in the tank to introduce gas therein, and also to cause the liquid in the tank in the general area below the aerating device to follow generally vertical flow paths between the aerating device and the bottom of the tank, the aerating device being of such a size that the width of the area of the vertical flow paths created by said aerating device extend across the tank a distance approximately equal to the said certain width of the aeration tank, wherein as the aeration device moves along the tank longitudinally thereof, it aerates the liquid locally across the entire said width of the tank while it leaves relatively quiescent the portions of the elongated tank ahead of and behind the aerating means.

2. Apparatus according to claim 1 wherein the said aeration tank is generally straight and located adjacent a straight secondary liquid treatment tank, and generally parallel thereto, said bridge extending across both of said tanks and movable in the elongated direction thereof, said bridge including a scraping device attached thereto for movement therewith and extending into the secondary tank for scraping the secondary tank on movement of the bridge, the said aerating device being mounted on the bridge such that the axis of rotation of the aerating means is adjustable to either a vertical or an inclined position, and including means for permitting variation of the vertical position of the aerating means relative to the bridge, and wherein said aerating means comprises a plurality of vanes arranged about the axis of rotation and extending downwardly and outwardly relative to the said axis.

3. Apparatus according to claim 1 wherein the said aerating device is mounted on said bridge such that the axis of rotation of the aerating means is adjustable to either a vertical or an inclined position.

4. Apparatus according to claim 1 including means for permitting variation of the vertical position of the aerating means relative to the bridge.

5. Apparatus according to claim 4 including a floating support member on the surface of the liquid, said aerating means being supported on the floating member, whereby the vertical position of the aerating means maintains a constant position relative to the surface of the liquid in the tank.

6. Apparatus according to claim 5 including shiftable guide means connecting the floating member to the bridge such that the floating member is slidable vertically relative to the bridge but movable in the elongated direction with the bridge.

7. Apparatus according to claim 5 wherein the lower surface of the floating member is a baffle for receiving and deflecting liquid thrown radially outwardly by the said aerating means.

8. Apparatus according to claim 7 wherein the baffle is downwardly concave and arranged to receive liquid thrown outwardly by the aerating means and deflect the same downwardly toward the bottom of the tank.

9. Apparatus according to claim 1 wherein said aerating means comprises a plurality of vanes arranged about the axis of rotation and extending downwardly and outwardly relative to the said axis.

10. Apparatus according to claim 1 wherein the said aeration tank is generally annular and surrounds a secondary liquid treatment tank to which the liquid flows from the aeration tank, said bridge extending from the center of the said secondary tank to the outer periphery of the aeration tank, said bridge being movable about an axis at the center of the secondary tank and scraper means for scraping solid material in the secondary liquid treatment tank.

11. Apparatus according to claim 10 wherein said scraping means include a scraping device attached to the bridge for movement therewith and extending into the secondary tank for scraping the secondary tank upon said movement of the bridge.

12. Apparatus according to claim 1 wherein the said aeration tank is generally straight and located adjacent a straight secondary liquid treatment tank to which the liquid flows from the aeration tank and generally parallel thereto, said bridge extending across both of said tanks and movable in the elongated direction thereof and scraper means for scraping solid material in the secondary liquid treatment tank.

13. Apparatus according to claim 12 wherein the scraper means includes a scraping device attached to the bridge for movement therewith and extending into the secondary tank for scraping the secondary tank upon said movement of the bridge.

14. Apparatus according to claim 1 wherein the said aeration tank is generally annular and surrounds a secondary liquid treatment tank, said bridge extending from the center of the said secondary tank to the outer periphery of the aeration tank, said bridge being movable about an axis at the center of the secondary tank, and including a scraping device attached to the bridge for movement therewith and extending into the secondary tank for scraping the secondary tank upon said movement of the bridge, the said aerating device being mounted on the bridge such that the axis of rotation of the aerating means is adjustable to either a vertical or an inclined position, and including means for permitting variation of the vertical position of the aerating means relative to the bridge, and wherein said aerating means comprises a plurality of vanes arranged about the axis of rotation and extending downwardly and outwardly relative to the said axis.

15. In the treatment of a liquid of the type having solid material therein capable of being flocculated, and wherein a gas is introduced into the liquid, the method comprising the steps of: placing the liquid to be treated into a narrow elongated tank of a certain width, moving a rotating aerating device in the elongated direction of the tank, aerating the liquid in the tank by rotating the aerating device about an axis with the device at least partially immersed in the liquid, such that the liquid in the tank in the general area below the aerating device follows generally vertical flow paths between the aerating device and the bottom of the tank, such that the movement of the vertical flow paths extend across the entire said certain width of the tank and so that movement of the liquid in the portion of the tank ahead of and behind the area of said vertical flow paths is slight relative to the movement of the liquid in the flow paths, such that flocculation of the said solid material of the liquid is promoted in the said other portions of the tank.

References Cited

UNITED STATES PATENTS

| 3,208,734 | 9/1965 | Wood et al. | 210—219X |
| 3,435,954 | 4/1969 | Ohl et al. | 210—527X |
| 3,330,413 | 7/1967 | Danjes | 210—195 |

JAMES L. DECESARE, Primary Examiner

U.S. Cl. X.R.

210—219, 242, 527, 530